DIGITAL TO ANALOG CONVERTER AND PLOTTER

Filed Feb. 16, 1955 3 Sheets-Sheet 1

INVENTOR.
SAMUEL G. COHEN
BY H. L. Mackey
ATTORNEY.

DIGITAL TO ANALOG CONVERTER AND PLOTTER

Filed Feb. 16, 1955 3 Sheets-Sheet 2

INVENTOR.
SAMUEL G. COHEN

BY H. L. Mackey
ATTORNEY.

June 2, 1959 S. G. COHEN 2,889,189

DIGITAL TO ANALOG CONVERTER AND PLOTTER

Filed Feb. 16, 1955 3 Sheets-Sheet 3

INVENTOR.
SAMUEL G. COHEN

BY

ATTORNEY.

2,889,189

DIGITAL TO ANALOG CONVERTER AND PLOTTER

Samuel G. Cohen, Ossining, N.Y., assignor to General Precision Laboratory Incorporated, a corporation of New York Application February 16, 1955, Serial No. 488,611

5 Claims. (Cl. 346—35)

This invention relates to automatic graph plotters and more specifically to such devices for plotting on a moving chart strip discrete points representing data values presented to the device in digital form.

One form of computer presents its output data in the form of punched cards which contain vertical rows of digits of the decimal numerical system, so that a number can be represented by digits punched out of consecutive rows of the card. The machine also generates electrical output data representing the punch card numbers by pulses in selected conductors of a cable.

When the numbers punched in a group of such punched cards represent systematically varying data, the data may be reduced to graph form by manually plotting the numbers. This manual operation is laborious and if the number of cards be great or time be short, manual plotting is impractical.

The present invention provides an instrument for plotting such a graph automatically. Its input consists of electrical pulse signals of decimal digital form impressed on a group of conductors, one conductor being provided for each decimal digit in each digit place. For example a three-digit number would require ten conductors for the units digits, ten for the tens digits, and ten for the hundreds digits, or a total of thirty conductors. These input signals may be generated in a card punch machine or otherwise. The instrument plots graphs on a moving strip of paper by marking discrete dots thereon, each dot representing one group of three pulses in the case of a three-digit decimal number, or $n$ pulses in the case of an $n$-digit number. When the input data is derived from punched cards each dot of the graph represents one card punch number indicated by holes punched in the card. The instrument is arranged to print one to four graphs on the same strip of paper representing, if derived from cards, one to four sets of numbers punched in each card.

The instrument contains one relay for each input conductor which is operated by a pulse in that conductor. Thus a three digit number will operate three relays. Conversion of the number from the decimal digital form to the analog or scalar form is accomplished by transferring the data from the relays to step switches. These step switches complete a path to a plurality of brushes ranged across a wide paper strip and bearing on it. Marking of the paper by transmitting current through one of the brushes then will represent the number by its scalar position across the paper strip. In the case of a three-digit number the position is thus marked in terms of the values of the hundreds and tens digits of the number. The units value is secured by mechanically moving the yoke holding the brushes transversely of the paper strip. Repetition of this process, as the paper moves lengthwise, marks the paper with a series of dots representing input data values.

The principal object of this invention is to provide an automatic plotter for plotting a series of marks on paper representing a series of electrical decimal digital input data.

Another object of this invention is to provide a device for electrically receiving number data punched in decimal digital form on punch cards, and for plotting marks representing those numbers to form a graph on a paper strip.

A further understanding of this invention may be secured from the detailed description and drawings, in which:

Figures 1 and 2, taken together, constitute a schematic diagram of the relay and switch portions of the instrument of the invention.

Figure 1:
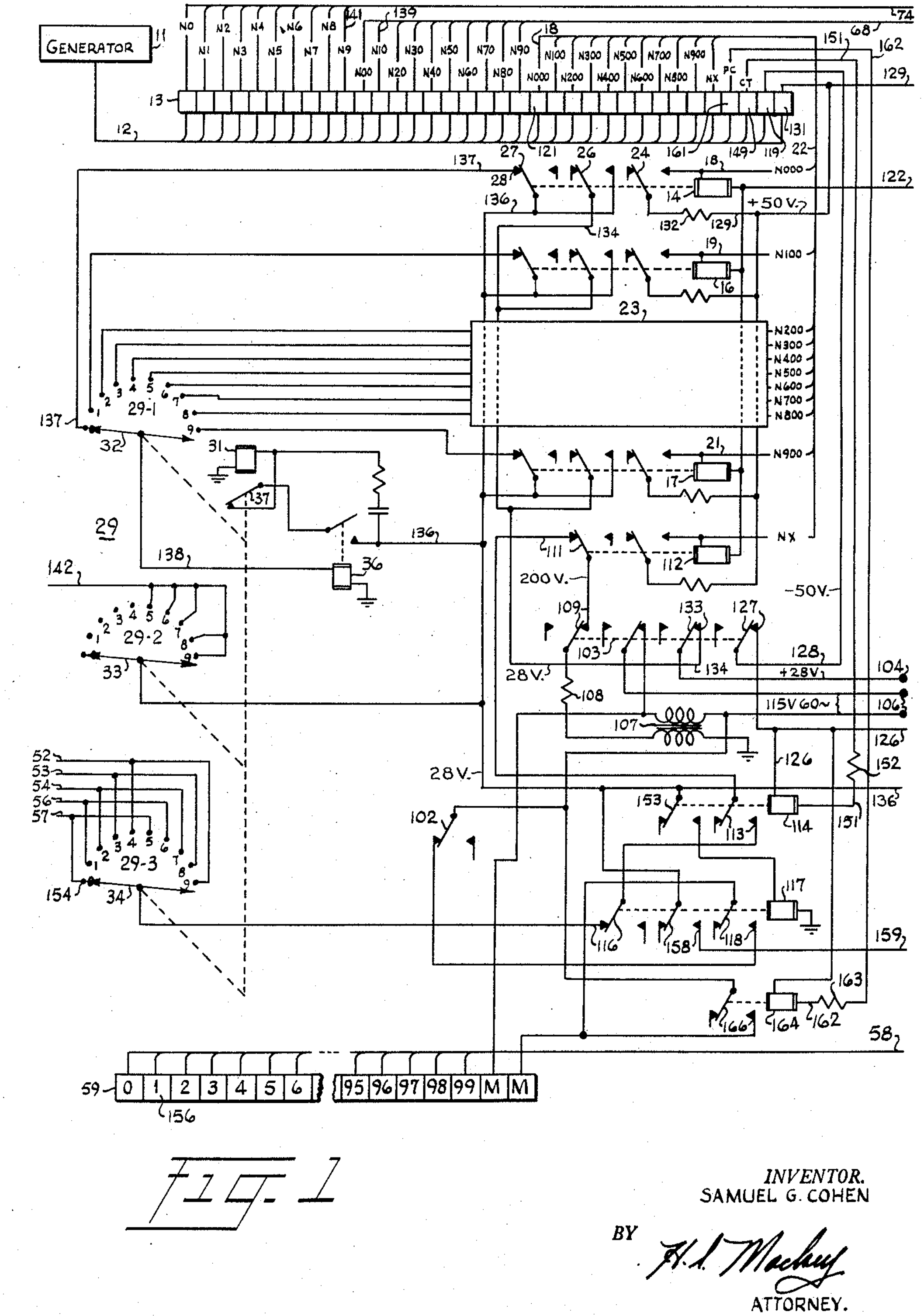

Referring now to Fig. 1, a generator 11 generates electrical signals consisting of 9-millisecond pulses applied to selected conductors of a cable 12 so as to represent numbers. In this example 30 conductors are employed to represent the 30 digits in the first three digit places of a decimal number, so that three pulses on conductors in the three digit groups or ranks will completely represent a three-digit number. The generator 11 is a computing card punch, and may, for example, be the commercial device known as the No. 602A calculating punch produced and sold by the International Business Machines Corporation. Any other calculating or business machine having the requisite digital electrical output may be employed in place of the computing punch as, for example, the No. 026 key punch or the No. 517 gang punch produced by the same corporation.

The cable 12 is terminated on one side of a terminal strip 13. The corresponding conductors connected to the other side are coded at both ends N0, N1, etc., to N9 for the ten conductors carrying unit digit signals, N00 to N90 for the ten conductors carrying ten digit signals, and N000 to N900 for the ten conductors carrying hundreds digit signals.

Three sets of ten relays each are provided, one set connected to the units conductors N0 to N9, one set connected to the tens conductors N00 to N90, and the remaining set connected to the hundreds conductors N000 to N900. Three of the ten relays constituting the hundreds set are shown explicitly as relays 14, 16 and 17 for reception of signals representing the hundreds digits 0, 1, and 9 respectively. The signal input conductors 18, 19 and 21 connected to these relays are coded at the relays, N000, N100 and N900 respectively, thus indicating that these conductors connected through cable 22 to terminal strip 13 are the same as the identically-coded conductors appearing at the terminal strip 13. The remaining seven relays of the set of ten, having the function of reception of signals representing the hundreds digits 2, 3, 4, 5, 6, 7 and 8, are implicitly indicated by the rectangle 23, all connections being similar to those explicitly shown.

Each of the ten relays has three sets of contacts. For example, relay 14 has a locking contact armature 24, an interlock contact armature 26, and a third contact armature 27 associated with a back contact 28 connected to a hundreds digit step switch 29.

The hundreds digit step switch 29 is provided with an operating solenoid 31 and has three banks of contacts numbered 29—1, 29—2 and 29—3. Each bank contains ten contacts numbered 0 to 9 arranged in a semicircle and swept by a double contact arm, the arms being designated 32, 33, and 34 respectively. An electromagnetic relay 36 is connected for relay operation of the solenoid 31 because of limited current carrying capacity of the solenoid stepping contacts 37. In the absence of this design limitation the contact arm 32 of bank 29—1 can be connected directly to the solenoid stepping contact 37 and relay 36 can be omitted. The ten contacts of bank 29—1 are connected to the respective contacts of the ten hundreds digit relays. The function of bank 29—3 is to select the proper bank of another stepping switch termed the tens digit switch, and the functions of bank 29—2 is to select one of the two halves of the bank so selected.

In place of the described step switches other types may be employed having effectively ten contacts as, for example, a switch having ten contacts arranged in a 120° arc swept by a triple arm. Alternatively, a switch having 20 contacts in a 180° arc and a double arm can be used if the contacts are connected in parallel in sets of ten.

Figure 2:
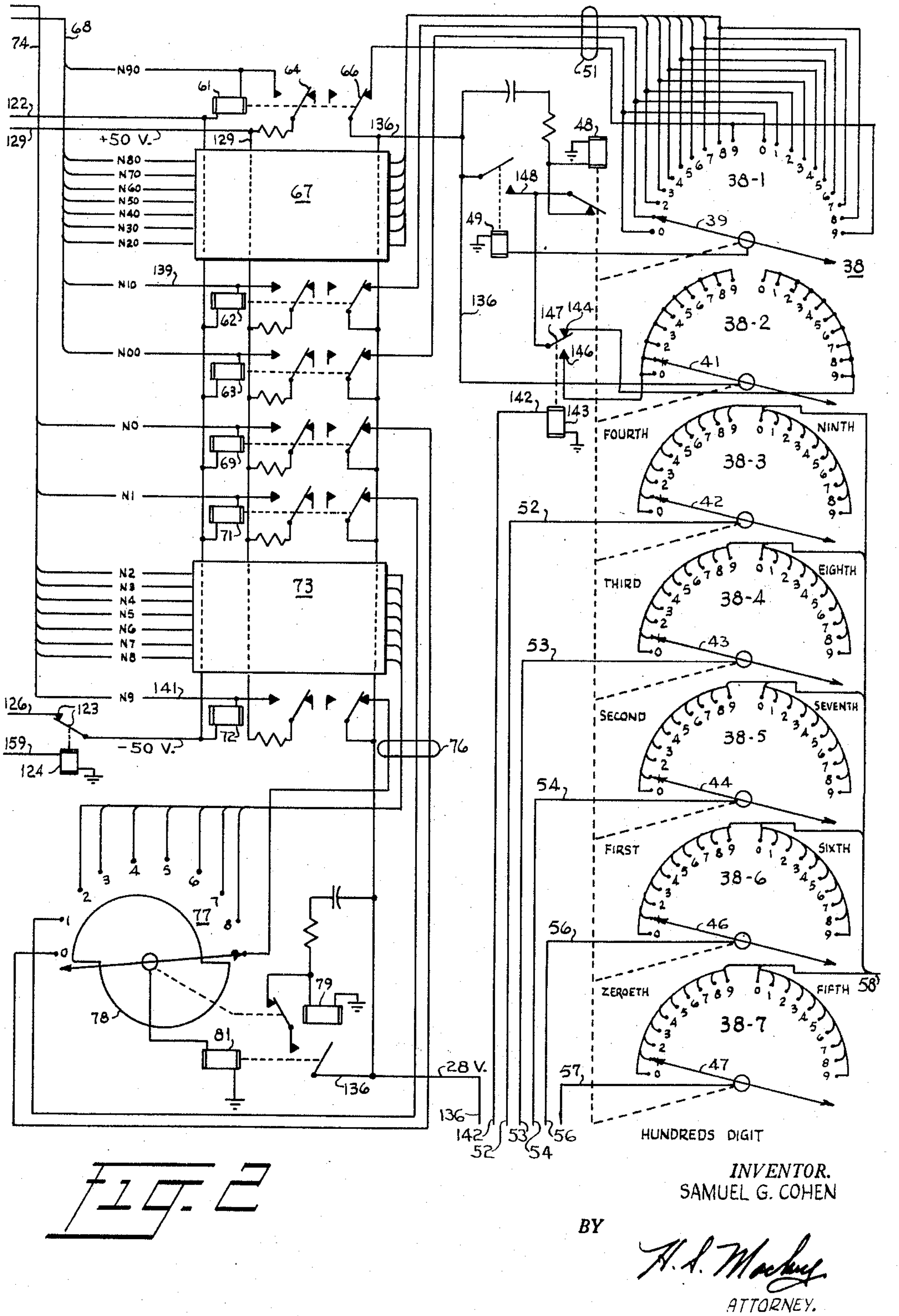

The tens-digit step switch 38, Fig. 2, has seven banks of 20 contatcs each, each bank being swept by a double contact arm. The banks are designated 38—1, 38—2, 38—3, 38—4, 38—5, 38—6, 38—7, and the contact arms are respectively designated 39, 41, 42, 43, 44, 46 and 47. This step switch has an operating solenoid 48, and an operating relay 49 is provided because of the heavy contact duty required. Each bank has 20 contacts numbered in duplicate quadrants 0 to 9. The contacts of bank 38—1 are connected in parallel to ten relay conductors which constitute the cable 51. The contact arms 42, 43, 44, 46 and 47 are connected through conductors 52, 53, 54, 56 and 57 to the respective contacts 4, 3, 2, 1 and 0 of bank 29—3, Fig. 1, of step switch 29. The one hundred contacts of banks 38—3, 38—4, 38—5, 38—6, and 38—7, of step switch 38, Fig. 2, are connected through the one hundred conductors of cable 58 to a terminal block 59, Fig. 1.

The tens-digit set of ten relays consists of the three relays 61, 62 and 63, Fig. 2, explicitly shown, each with a locking contact armature such as the armature 64 of relay 61, and an output contact armature such as armature 66 of relay 61. Seven realys are implicitly shown by the rectangle 67. The ten conductors of cable 51 are connected to the back contacts associated with the output contact armatures. The ten relays of the tens-digit set are operated through conductors coded at both ends N00, N10, etc., connected to the tens terminals of terminal strip 13, Fig. 1, the conductors being formed into cable 68.

A set of ten units-digit relays is provided of which three relays 69, 71 and 72, Fig. 2 are explicitly shown and seven are implicitly shown by the rectangle 73. These relays are operated from ten terminals of terminal strip 13 through ten conductors coded N0, N1, N2, etc., constituting cable 74. Each relay has a locking contact armature and an operating contact armature. The back operating conatcts are connected through ten conductors of cable 76 to the ten contacts marked 0 to 9 of a rotary switch 77. This switch 77 is provided with a bisymmetrical cam 78 secured to its shaft. An operating solenoid 79 and heavy-current relay 81 are provided for its operation.

Figure 3:
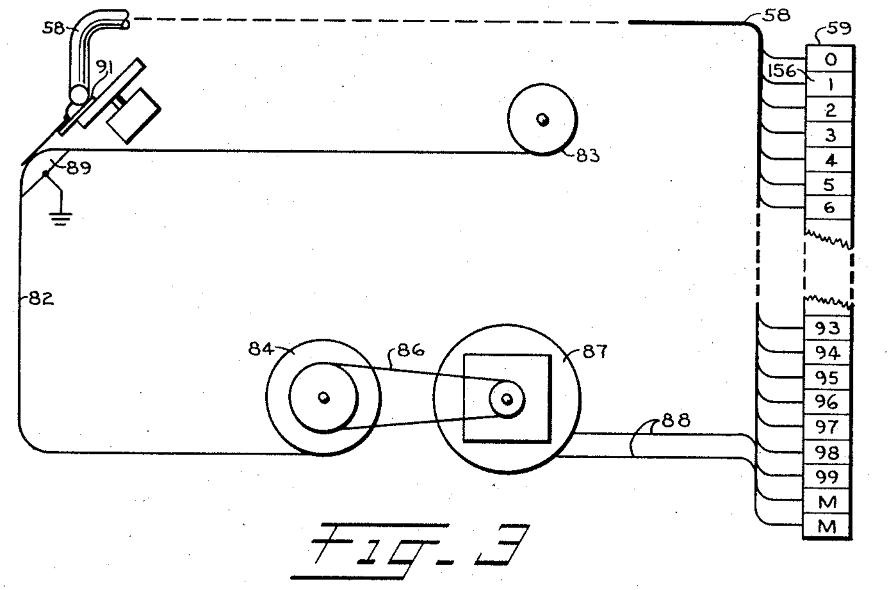
Figure 3 is a side view of the recording portion of the instrument.
Figure 5:
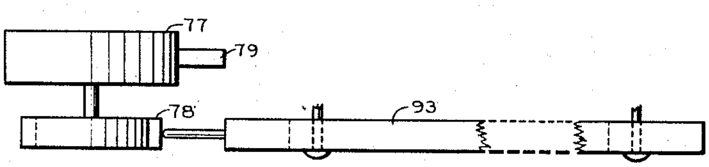
Figure 5 is a side view of the components of Fig. 4.
Figure 4:
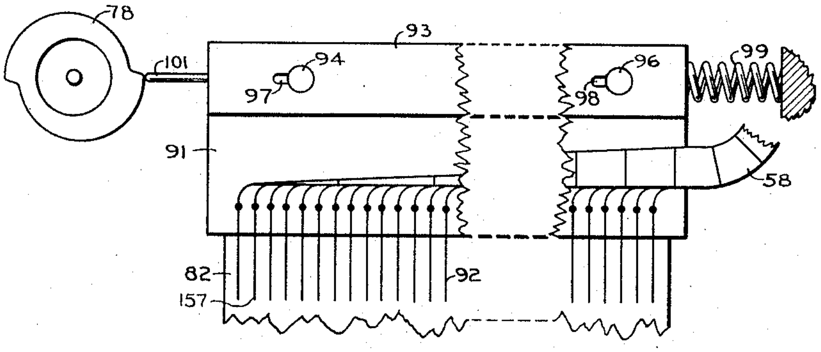
Figure 4 is a plan view of the brushes, brush yoke and cam of the recording portion.

The terminal strip 59, Figs. 1 and 3, is connected to a recorder for drawing graphs on a moving strip of paper by marking consecutive data points thereon. The recorder contains a strip of paper 82, Fig. 3, taken from a storage roll 83 and rolled onto a driven take-up roll 84. Roll 84 is driven through a belt 86 from a geared-down motor 87. The motor 87 is operated by current applied through conductors 88 from terminals M—M of terminal strip 59. As the paper strip passes from roll 83 to roll 84 it passes around a grounded metal strip 89. An insulating brush block 91, Figs. 3 and 4 is provided with 100 equally spaced brushes such as brush 92, each brush consisting of a resilient metal wire or strip. The insulating block 91 is securely fastened to a jigger strip 93, Figs. 4 and 5, held by two rivets 94 and 96 passing through elongated slots 97 and 98 so that the strip 93 has a small amount of freedom to slide longitudinally. The amount of this freedom is exactly equal to the distance between adjacent brushes. The jigger strip 93 is urged to the left by a compression spring 99 pressing against its right end. The cam 78, Figs. 2 and 4, which is bisymmetrical with the radix proportional to the angle, is positioned in contact with a cam follower 101 secured to the left end of the jigger strip 93. Thus clockwise rotation of cam 78 produces proportionally linear motion of the jigger strip 93 and of the attached brushes.

When the digital plotter is to be operated, the manual switch 102, Fig. 1, is closed and the manual power switch 103 is operated to the position shown in the drawing. This operation connects a grounded +28-volt direct-current supply represented by terminal 104 to the interlock armatures 26 etc., of the set of ten hundreds-digit relays. The switch 103 also connects a 115-volt alternating-current supply represented by terminals 106 to a transformer 107 having an open-circuit output voltage of 250 volts R.M.S., the load voltage of which is reduced to 200 volts by a series resistor 108. This voltage is applied through switch arm 109, contacts 111 of relay 112, contacts 113 of relay 114 when operated, and contacts 116 of relay 117 when unoperated to the brush arm 34 of bank 29—3 of stepping switch 29. The power switch also connects the 115 volt supply to terminals M—M of terminal strip 59, operating the recorder motor 87, Fig. 3, through contacts 118 of relay 117 when operated and the switch 102. The power switch 103 also completes the return circuit at terminal 119 of strip 13 of a 50-volt direct-current supply secured from generator 11.

At the time that operation is begun the positions of the three step switches are immaterial. All relays are normal before operation and the step switches are quiescent. The paper strip moves a fixed amount (approximately 1/16") after each 1, 2, 3 or 4 points have been plotted depending upon the number of graphs being plotted.

In order to start operation of the plotter the computing punch 11 is started, generating electrical pulses. The computing punch has a one-second cycle. That is, the operation on each number consumes one second, one, two, three or four three-digit numbers being punched in each card. If the punch is set to operate on a single three-digit number per card, then during the first 0.4 second of the cycle, three 9 ms. pulses are transmitted through cable 12, one on one of the units conductors N0 to N9, one on one of the tens conductors N00 to N90, and one on one of the hundreds conductors N000 to N900. Considering the hundreds unit pulse first, assume that the pulse represents the zero hundreds digit value and thus is transmitted to the N000 conductor 18. This pulse is derived from the 50-volt direct-current source in the computer punch and is positive in polarity. The pulse is transmitted from terminal 121 of terminal strip 13 through conductor 18, the coil of relay 14, bus 122, normally closed back contacts 123 of reset relay 124, conductor 126, power switch closed armature contacts 127, and conductor 128 to the −50 volt terminal 119. Relay 14 operates and locks closed through +50-volt conductor 129 from the +50-volt terminal 131 and resistor 132, which reduces the voltage at the relay coil to 28 volts. Operation of interlock contact armature 26 applies 28-volt potential from power switch closed contacts 133 through conductor 134 to the 28-volt bus 136, which is connected through the back contacts of the operating contact armatures of the hundreds set of relays to all of the contacts of the bank 29—1 of step switch 29 with the single exception of the zero contact. Since the zero contact is connected through conductor 137 to the back contact 28 of relay 14, and since relay 14 is operated, the zero contact of bank 29—1 is unenergized. If therefore at this time step switch 29 is on any contact step except zero, current will flow through the contact arm 32, conductor 138, and the coil of relay 36 to ground. Relay 36 operates, connecting the 28-volt bus 136 to the operating solenoid 31. This solenoid operates, stepping switch 29 around to contact zero, where it stops.

Thus the operation of any one of the hundreds set of relays operates the hundreds step switch to the corresponding contact.

Additionally, energization of the 28-volt bus 136 through the back operating contacts of the ten tens-digit relays energizes all 20 contacts of the tens step switch bank 38—1, and through the back operating contacts of the ten units digit relays energizes all ten contacts of the units step switch 77. These tens and units step switches, being connected for operation similarly to the hundreds step switch, immediately start stepping.

When the 9 ms. tens pulse is received it passes through one of the tens conductors, for example conductor 139 coded N10, operating the corresponding relay 62 and removing potential from the step switch contact numbered 1 while potential is still applied to the other contacts. The tens step switch 38 accordingly operates, stopping on contact 1.

Similarly, when the 9 ms. units pulse is received it passes through one of the units conductors, for example, conductor 141 coded N9, operating the corresponding relay 72 and removing potential from step 9 of the step switch 77, while potential is still applied to the other contacts. The step switch operates and stops on contact 9. As the step switch rotates it moves cam 78, Figs. 2, 4 and 5 to position the brush yoke 91 to the rightmost point of its movement. Each of the brushes 92 is thus positioned $\frac{9}{10}$ of the distance between brushes to the right of its zero or left-most position.

To recapitulate, during the first 0.6 second of the cycle of operation of the computing punch 11, three pulses have operated relays and the three step switches have been positioned and stopped on contacts representing the digital values of the three pulses.

At the time that the hundreds pulse is received and the hundreds relay energizes the 28-volt bus 136 as described, another action occurs to select either the first or second group of ten contacts of each of the five stepping switch banks 38—3, 38—4, 38—5, 38—6 and 38—7. This selection is effected as follows. Bank 29—2 of stepping switch 29 is divided into two halves of five contacts each, and in the second half its contacts 5, 6, 7, 8 and 9 are connected through conductor 142 to the coil of relay 143. The back contact 144 of this relay is connected to the right ten contacts of bank 38—2, while the front contact 146 is connected to the left ten contacts. The brush arm 41 is connected to the 28-volt bus 136 while the relay armature 147 is connected to the forward contact 148 of relay 49. Thus the contacts of relay 143 together with either half of the contacts of bank 38—2 are in shunt with the contacts of relay 49. The effect is that, if bank 29—2 is stepped to one of contacts 0–4, relay 143 remains normal and the right half of bank 38—2 is connected in shunt to relay 49. Therefore stepping switch 38 cannot rest on its right ten contacts, but can come to rest only on one of its left ten contacts. If, however, bank 29—2 is stepped to one of its contacts 5–9, relay 143 is operated, the left half of bank 38—2 is energized, preventing step switch 38 from stopping thereon, and this switch must come to rest on one of its right ten contacts. Thus either the left halves of step switch contacts in its five output banks are selected, representing the zeroeth, first, second, third and fourth hundreds digits, or the right halves representing the fifth, sixth, seventh, eighth and ninth hundreds digits.

An equivalent construction can be used to employ ten, ten-contact banks in place of the 20-contact banks 38—3, 38—4, 38—5, 38—6 and 38—7, eliminating the need for banks 29—2 and 38—2 and relay 143.

After the computer punch has generated the three digital pulses it generates a 0.3 second cycle timing pulse at 50 volts direct current, which is received at terminal 149 of terminal strip 13. This pulse is transmitted through conductor 151 and resistor 152 to the coil of cycle timing relay 114, returning through conductor 126 and the power switch 103 to the —50-volt bus 128. When relay 114 operates it applies 28 volts through armature 153 to the coil of relay 117, which is of the slow-operate type and introduces a delay of 30 to 40 ms. During this delay period contacts 113 are closed, applying 250 volts R.M.S. through closed back contacts 116 to step switch arm 34. This potential passes through the zero contact 154 of bank 29—3, on which arm 34 is now resting as was described, through conductor 57, arm 47 of bank 38—7, Fig. 2, contact numbered 1 of the left half of bank 38—7 on which the arm 47 is resting in accordance with actions described, and through cable 58 to terminal 156, Fig. 1, designating the value 1, of terminal strip 59. The potential passes from terminal 156, Fig. 3, to the brush 157, Fig. 4, which represents by its position on the paper strip an analog value lying between 010 and 019.

The resolution of the units place value of the data, to control which unit value lying between 010 and 019, inclusive, is selected, depends on the physical position of the brush on the paper which is determined by the distance through which the brush yoke 93 has been forced by the cam 78, as previously described. Since this position represents the units digit 9, the complete value is 019.

The specially-treated paper 82, Figs. 3 and 4 is slightly conductive, so that passage of current from brush 157 through the paper to the grounded strip 89 leaves a black mark on the paper. In addition, the initial potential of 250 volts R.M.S. is sufficiently intense to produce a small hole in the paper. This permits reproduction of the record by photographic contact printing processes.

At the end of the 30 to 40 ms. delay period of relay 117, this relay operates, cutting off the 250-volt marking potential. Contacts 118 close, starting the paper-moving motor, which runs for the remainder of the 0.3 second pulse. The length of time during which this motor runs and consequently the amount of paper movement can be adjusted by adjusting in the computer punch the length of the pulse to be somewhat more or less than 0.3 second. When relay 117 operates it closes contacts 158, applying 28-volt potential through conductor 159 to a reset relay 124, Fig. 2. This relay 124, upon operation, opens the return connections of the coils of all three sets of digit relays, thus releasing relays 14, 62 and 72 which have been locked closed until this time. The release of the hundreds relay 14 removes potential from the 28-volt bus 136, thus preventing all stepping switches from operation until a hundreds relay shall again have been closed by a pulse from the computer punch. At the end of the 0.3 second cycle timing pulse relays 114 and 117 are released, releasing relay 124 and also stopping the motor.

The computer punch completes its cycle, after which it commences its next cycle, transmitting 9 ms. pulses through cable 12 representing the number punched in the next card, and the operations described are repeated.

When two, three or four numbers are represented by digital punches in each card the operation of the plotter is modified to draw two, three or four corresponding graphs on the moving paper strip. In order to operate when four numbers appear in each card, for example, paper move switch 102 is opened. An appropriate adjustment in the computer punch results in a pulse of approximately 0.3 second being applied, at the end of the fourth record transmitted from each card to terminal 161 of terminal strip 13. This pulse is applied through conductor 162 and resistor 163 to a paper control relay 164. Closing of contacts 166 of this relay operates the paper move motor for the duration of the pulse.

What is claimed is:

1. A digital plotter adapted to receive digital numerical data from a pulse generator in the form of discrete single pulses for each digital place and to plot the data in analog form comprising, a plurality of electromagnetic relays, circuit means for applying respective ones of the pulses produced by said pulse generator to selected ones of said electromagnetic relays whereby selected ones of said electromagnetic relays are operated to their energized position digitally storing said data, a plurality of step switches, means for operating each individual one of said step switches to a position determined by the energization of individual ones of said electromagnetic relays, whereby said digitally stored data are stored in analog form in said step position switches, a graph point plotter, and control relays connecting said step switches to operate said graph point plotter, said plotter plotting successive points of an analog graph representing successive numbers of said received digital data.

2. A digital plotter adapted to receive digital numerical data from a pulse generator in the form of discrete single pulses for each digital place and to plot the data in analog form comprising, a plurality of electromagnetic relays, circuit means for applying respective ones of the pulses produced by said pulse generator to selected ones of said electromagnetic relays whereby selected ones of said electromagnetic relays are operated to their energized position digitally storing said data, a plurality of step switches each having a plurality of contacts respective ones of which are connected to contacts of respective ones of said electromagnetic relays, each of said step switches including an operating solenoid, circuit means interconnecting each operating solenoid with the contacts of the electromagnetic relays connected with the contacts of the step switch of the associated operating solenoid for causing each individual step switch to assume a position determined by the energization of the individual one of said electromagnetic relays whose contacts are connected thereto, a graph point plotter, and control relays connecting said step switches to operate said graph point plotter, said plotter plotting successive points of an analog graph representing successive numbers of said received digital data.

3. A digital plotter adapted to receive digital numerical data from a pulse generator in the form of discrete single pulses for each digital place and to plot the data in analog form comprising, a plurality of step switches the number of which is equal to the number of digital places of said numerical data, a group of electromagnetic relays associated with each step switch, each group comprising a plurality of relays each having a respective contact connected to a respective contact of the associated step switch, means for actuating a respective one of the relays of each group to its energized position by a respective one of said pulses, an operating solenoid for each step switch, means including a contact of the actuated relay of a respective group and the contacts of the remainder of the relays of the respective group connected to the contacts of the associated step switch for energizing the operating solenoid of said associated step switch whereby each step switch is moved to a position determined by the energization of the particular one of the individual relays associated therewith, a graph point plotter, and control relays connecting said step switches to operate said graph point plotter, said plotter plotting successive points of an analog graph representing successive numbers of said received digital data.

4. A digital plotter adapted to receive digital numerical data from a pulse generator in the form of discrete single pulses for each digital place and to plot the data in analog form comprising, a plurality of relay ranks the number of ranks of which is equal to the number of digital places of said numerical data, each rank being composed of a plurality of relays the number in each rank of which is equal to the radix of the digital data, an individual circuit connecting each of said relays to said pulse generator whereby a single one of the relays of each rank is actuated to its energized position by a single pulse corresponding to the digital place value of said rank, a step switch associated with each relay rank and interconnected with the respective contacts of the relays incorporated in the associated relay rank, means operating the respective step switches to positions determined by the particular relay energized in the associated relay rank, control relays operated by said pulse generator, a graph plotter, and means including said control relays for transmitting energy from said step switches to said graph plotter for plotting points representing the analog data stored in said step switches.

5. A digital plotter adapted to receive pulses representing decimal digital data from a pulse generator and to plot the data in analog form comprising, a plurality of relay ranks, each rank consisting of ten electromagnetic relays representing the ten digits of the decimal number system, each rank representing a digit place or position, each of said electromagnetic relays being connected to said pulse generator whereby selected relays are operated by digital pulses produced by said pulse generator, a plurality of ranks of steps switches equal in number to the number of digit places, means operating said step switches by said operated selected relays to store in the form of step switch position analog data equaling in value said digital data, control relays connected for operation by said pulse generator, a graph point plotter, and means including said control relays for transmitting energy from said step switches to said graph point plotter for plotting points representing the analog data stored in said step switches.

References Cited in the file of this patent

UNITED STATES PATENTS

| | | |
|---|---|---|
| 1,138,089 | Crumpton | May 5, 1915 |
| 1,309,413 | Hopkins | July 8, 1919 |
| 2,101,452 | Rauch | Dec. 7, 1937 |
| 2,431,651 | Spencer | Nov. 25, 1947 |
| 2,567,134 | Stuivenberg | Sept. 4, 1951 |
| 2,718,634 | Hansen | Sept. 20, 1955 |